United States Patent [19]

Miller et al.

[11] Patent Number: 5,678,182

[45] Date of Patent: Oct. 14, 1997

[54] SELF-LOCATING RADIO SYSTEM THAT AUTOMATICALLY CONFIGURES TO THE RADIO REGULATIONS FOR THE LOCATION

[75] Inventors: Frances W. Miller, Redwood City; David G. Bird, Sunnyvale, both of Calif.

[73] Assignee: Trimble Navigation Limited, Sunnyvale, Calif.

[21] Appl. No.: 491,628

[22] Filed: Jun. 19, 1995

[51] Int. Cl.$^6$ ............................. H04B 7/26; H04Q 7/22

[52] U.S. Cl. ............ 455/33.1; 455/54.1; 455/12.1; 342/463

[58] Field of Search ........................... 455/33.1–33.4, 455/54.1, 53.1, 12.1, 69, 127, 32.1; 342/419, 420, 457, 463

[56] References Cited

U.S. PATENT DOCUMENTS

| | | | |
|---|---|---|---|
| 5,235,633 | 8/1993 | Dennison et al. | 455/33.2 X |
| 5,442,805 | 8/1995 | Sagers et al. | 455/33.1 |

FOREIGN PATENT DOCUMENTS

92-19050  10/1992  WIPO .

*Primary Examiner*—Chi H. Pham
*Attorney, Agent, or Firm*—David R. Gildea

[57] ABSTRACT

A radio system that determines its location and configures itself according to the radio communication regulations of the location. The radio system includes a reference station and a rover station. The reference station includes a GPS receiver for determining a reference geographical location, a map converter for storing information for the parameter values for the radio regulations in one or more geographical regions and for converting the reference geographical location to the parameter values for the geographical region that encloses the location, and a reference radio for transmitting a radio message signal according to the parameter values. The rover station includes a GPS receiver locator for determining a rover geographical location, a map converter for storing information for the parameter values for the radio regulations in the geographical regions and for converting the rover geographical location to the parameter values for the geographical region that encloses the location, and a rover radio for receiving the radio message signal according to the parameter values.

16 Claims, 5 Drawing Sheets

Fig_1

Fig_4

Fig_5

Fig_6A

SELF-LOCATING RADIO SYSTEM THAT AUTOMATICALLY CONFIGURES TO THE RADIO REGULATIONS FOR THE LOCATION

BACKGROUND OF THE INVENTION

1. Field of the Invention

The invention relates generally to radio communication systems and more particularly to a self-locating radio communication system that determines a location and configures automatically to the radio communication regulations of the location.

2. Description of the Prior Art

Radio systems are used in most countries of the world for communicating voice and data. The radio system includes a radio transmitter to transmit the voice and/or data in an airwave radio signal and a radio receiver to receive the airwave radio signal and issue the voice and/or data to a user. The airwave radio signal is characterized by particular values for certain signal parameters, such as frequency, transmit power level, occupied or necessary bandwidth, modulation type, baud rate, and protocols. In general, the parameters and the values are specified by radio communication regulations that are determined by an agency of the government of the country or region where the radio system is used. These parameters and values may be specified as general rules or as specific user licenses. In the United States each of several regions has radio regulations that are determined by the Federal Communication Commission (FCC). In the United Kingdom the Radiocommunications Agency (RA) performs a similar function. The Bundesamt für Zulassungen in der Telekommunikation performs a similar function in Germany. In Japan a similar function is performed by the Ministry of Post and Telecommunications. Typically, the radio regulations for each country or region are unique to that country or region. Because a unique or customized radio system is required for each unique radio regulation, a variety of radio systems are manufactured and distributed.

A well-known problem for the manufacturers and users of radio systems is that the variety of unique radio regulations and systems causes confusion and increases cost. Manufacturers have attempted to solve this problem by providing a radio system that has a capability of being configured by the user to meet the radio regulations of several countries. However, the FCC and other agencies will not allow such user accessible capability due to the chance that the user may configure the system incorrectly.

One application of the radio system is for communicating differential Global Positioning System (DGPS) corrections for a DGPS system. The DGPS system includes a differential reference GPS receiver located at a known location and a differential-ready GPS receiver whose location is to be determined. The differential reference GPS receiver receives a GPS signal having location information from several GPS satellites and computes the DGPS corrections by comparing location information in the GPS signal to information indicative of the known location. A radio transmits the DGPS corrections in the airwave radio signal to one or more radio receivers. The radio receiver passes the DGPS corrections to the differential-ready GPS receiver. The differential-ready GPS receiver receives the GPS signal from one or more of the same GPS satellites and applies the DGPS corrections to correct the location information. Using a DGPS system the accuracy of a GPS-derived location may be improved from a range of twenty to one hundred meters to a range of less than one meter to ten meters.

Another application of the radio system is for communicating real time kinematic (RTK) GPS reference information for an RTK GPS survey system. The RTK GPS survey system includes a RTK reference GPS receiver, typically located at a precisely known location, and one or more RTK surveyor GPS receivers at locations that are to be surveyed. The radio system transmits the RTK GPS reference information from the RTK reference GPS receiver to the RTK surveyor GPS receivers. The RTK surveyor GPS receiver receives the reference information and computes a survey line between the reference and the surveyor in real time. Commercial RTK GPS survey systems can measure a survey line of at least 10 kilometers with an accuracy of a few centimeters or better.

There is a need for a radio system that can be used in several countries and regions that automatically configures to the radio regulations of the country or region where the radio system is located. There is a further need for the radio system to communicate differential GPS corrections to a differential-ready GPS receiver and/or to communicate GPS RTK reference information to an RTK surveyor GPS receiver.

SUMMARY OF THE INVENTION

It is therefore an object of the present invention to provide a radio system having a capability of determining its geographical location.

Another object is to provide a radio system that automatically configures to the radio regulations for the country or region where the radio system is located.

Another object is to use the Global Positioning System (GPS) for determining the geographical location of the radio system.

Another object is to provide a radio system to configure itself to the frequency, the channel spacing, the transmit power, the bandwidth, the modulation type, the baud rate, and/or the protocol specified by the radio regulations for the location.

Another object is to provide a radio system to configure itself according to an alternative within the radio regulations that corresponds to a low ambient airwave signal energy level.

Another object is to communicate a message having differential GPS (DGPS) correction information.

Another object is to communicate a message having real time kinematic (RTK) GPS reference information.

Briefly, a preferred embodiment includes a reference station and a rover station. The reference station includes a reference locator for determining the geographical location of the reference station, a map converter for converting the reference geographical location to values of certain parameters of a radio regulation, and a reference radio for configuring to the radio regulation to transmit an airwave radio message signal according to the parameter values. The rover station includes a rover locator for determining the geographical location of the rover station, a map converter for converting the rover geographical location to the values of the parameters of the radio regulation, and a rover radio for configuring to the radio regulation to receive the airwave radio message signal according to the parameter values.

An advantage of the present invention is that the radio system has a capability of determining its geographical location.

Another advantage is that the radio system may be used within several countries or regions having unique radio regulations.

Another advantage is that the radio system uses the Global Positioning System (GPS) for determining the geographical location.

Another advantage is that the radio system configures to the frequency, the channel spacing, the transmit power, the bandwidth, the modulation type, the baud rate, and/or the protocol of the radio regulations.

Another advantage is that the radio system minimizes interference with other signals by selecting an alternative within the radio regulations having a low ambient airwave signal energy level.

Another advantage is that the radio system enables a differential-ready GPS receiver to improve the accuracy of a GPS-derived geographical location.

Another advantage is that the radio system enables an RTK surveyor GPS receiver to determine a survey line in real time.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENTS

Figure 1:
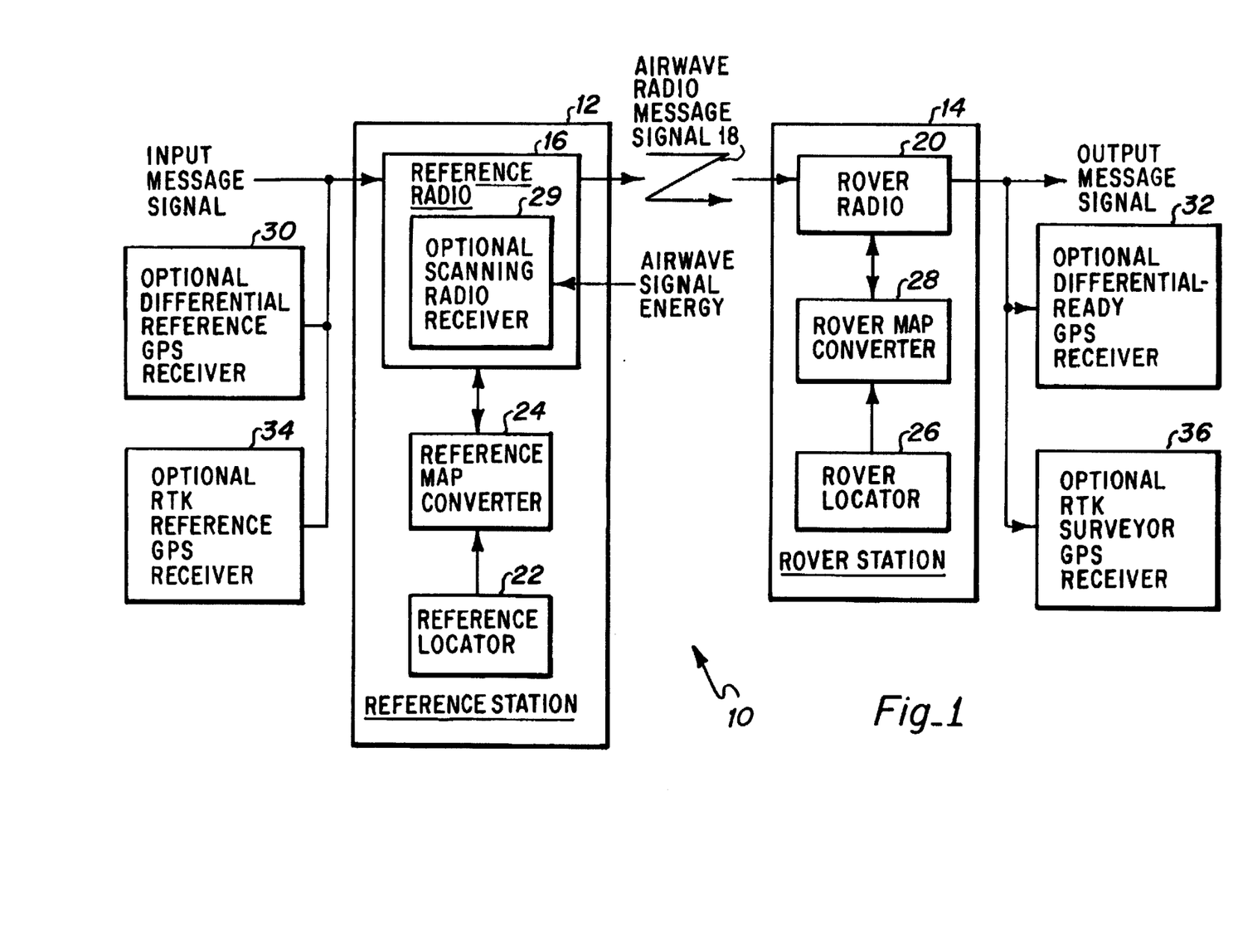
FIG. 1 is a block diagram of the present invention of a radio system for determining a geographical location and configuring to the radio regulations for the location.

FIG. 1 illustrates a radio system of the present invention referred to herein by the general reference number 10. The radio system 10 includes a reference station 12 and a rover station 14. Typically, the reference station 12 and the rover station 14 are located in the same country or region having the same radio regulations. The reference station 12 includes a reference radio 16 to receive an analog or digital message in an input signal from a user or user device and transmit the message in an airwave radio message signal 18. The rover station 14 includes a rover radio 20 to receive the airwave radio message signal 18 and issue the message in an output signal to another user or user device.

The reference station 12 includes a reference locator 22 to determine a geographical location of the reference station 12 and to issue information indicative of the reference geographical location in a signal to a map converter 24. The map converter 24 converts the reference geographical location to a reference parameter signal indicative of the radio communication regulations for the geographical location of the reference station 12 and issues the parameter signal to the reference radio 16. Similarly, the rover station 20 includes a rover locator 26 to determine a geographical location of the rover station 14 and to issue information indicative of the rover geographical location in a signal to a map converter 28. The map converter 28 converts the rover geographical location to a rover parameter signal indicative of the radio communication regulations for the geographical location of the rover station 14 and issues the parameter signal to the rover radio 20. The reference radio 16 configures itself according to the reference parameter signal to transmit the radio message signal 18. Similarly, the rover radio 20 configures itself according to the rover parameter signal to receive the radio message signal 18. The reference and the rover parameter signals include the values for parameters specified by the local radio regulations for the protocol, including a header, a synchronization pattern, a preamble, and a source identification; a baud rate; a modulation type, a bandwidth, a transmit frequency, and a transmit power. The modulation is a phase or frequency modulation such as the modulations commonly known as biphase shift key (BPSK), quadrature phase shift key (QPSK), offset QPSK (OQPSK), quadrature amplitude modulation (QAM), quadrature partial response (QPR), frequency shift key (FSK), constant phase FSK (CPFSK), minimum shift key (MSK), Gaussian MSK (GMSK).

The reference radio 16 optionally includes a scanning radio receiver 29 to receive a parameter scan signal from the map converter 24 and to receive airwave signal energy that meets the radio communication regulations for the reference geographical location. Most radio regulations allow alternative values for one or more parameters. For example several frequencies separated by channel spacings may be allowed within the radio regulations. When a plurality of parameter values is permissible, the map converter 24 provides each of the values in sequence in the parameter scan signal. The scanning radio receiver 29 configures itself according to the parameter scan signal, measures the ambient signal energy and issues a level signal to the map converter 24 for each alternative. The map converter 24 determines the alternative having the lowest ambient airwave signal energy level and issues the parameter signal for that alternative to the reference radio 16.

In a preferred embodiment, the reference locator 22 and rover locator 26 use a Global Positioning System (GPS) receiver to determine a geographical location from location determination information in a GPS signal from one or more GPS satellites. The GPS receiver is commercially available from several manufacturers including Trimble Navigation Limited of Sunnyvale, Calif. as a model "SVeeSix," Rockwell International Corp. of Newport Beach, Calif. as a model "Microtracker," or Motorola Corporation of Shaumberg, Ill. as a model "ONCORE." In alternative embodiments, the reference locator 22 and/or rover locator 26 may use other devices such as a GLobal Orbiting NAvigation SyStem (GLONASS) receiver for receiving a GLONASS signal from one or more GLONASS satellites, a LOng RAnge Navigation (LORAN) C receiver for receiving a LORAN C signal from three or more LORAN C transmitters, a DECCA receiver to receive a DECCA signal, or a beacon receiver to receive uncoordinated beacon signals. An example of a beacon receiver for the reference locator 22 and/or the rover locator 26 is described by Kelley et at. in U.S. Pat. No. 5,173,710 entitled NAVIGATION AND POSITIONING SYSTEM AND METHOD USING UNCOORDINATED BEACON SIGNALS the teachings of which are incorporated herein by reference.

The radio system 10 optionally includes a differential reference GPS receiver 30 connected to the reference station 12 and a differential-ready GPS receiver 32 connected to the rover station 14. The differential reference GPS receiver 30 is located at a known geographical location. The differential-ready GPS receiver 32 is located at a site whose geographical location is to be determined. The differential reference GPS receiver 30 receives the GPS signal from several GPS satellites and compares the geographical location information determined from the GPS signal to information for the surveyed geographical location. The difference is converted to differential GPS (DGPS) corrections. Information for the DGPS corrections, time of observation, and the particular GPS satellites used is issued in the message in the input signal to the reference radio 16. The differential-ready GPS receiver 32 receives the GPS signal from one or more of the same GPS satellites, receives the information for the DGPS corrections in the message in the output signal from the rover radio 20, and applies the DGPS corrections to provide a geographical location that is more accurate than the geographical location derived from the GPS signal without the DGPS corrections. Typically, the application of DGPS corrections improves the accuracy of a GPS determined location from a range of twenty to one hundred meters to a range of less than one meter to ten meters. Optionally, the differential reference GPS receiver 30 may be used as the reference locator 22 for providing the reference geographical location and the differential-ready GPS receiver 32 may be used as the rover locator 26 for providing the rover geographical location.

In another option, the radio system 10 includes a real time kinematic (RTK) reference GPS receiver 34 connected to the reference station 12 and an RTK surveyor GPS receiver 36 connected to the rover station 14. The RTK reference GPS receiver 34 is located at one end of a desired survey line. The RTK surveyor GPS receiver 36 is located at the other end of the desired survey line. The RTK reference GPS receiver 34 receives the GPS signal from several GPS satellites, computes RTK reference information from the GPS signal, and issues the RTK reference information as the message in the input signal to the reference radio 16. The RTK surveyor GPS receiver 36 receives the GPS signal from at least four of the same GPS satellites, receives the RTK reference information in the output signal from the rover radio 20, and computes the desired survey line in real time. Optionally, the RTK reference GPS receiver 34 may be used as the reference locator 22 for providing the reference geographical location and the RTK surveyor GPS receiver 36 may be used as the rover location 26 for providing the rover geographical location.

GPS receivers that are suitable for use in the present invention are available from several sources. The differential reference GPS receiver 30 is available from Trimble Navigation Limited of Sunnyvale, Calif. in several models of a "4000" series or from Ashtech of Sunnyvale, Calif. The Trimble model "SVeeSix" is capable of use for the differential-ready GPS receiver 32. The RTK reference GPS receiver 34 is available from Trimble as a model "4000RS" or from Ashtech. The RTK reference GPS receiver 34, and the RTK surveyor GPS receiver 36 are available as a pair from Trimble as a model "GPS Total Station System SSi" having a part no. "26870-00" or from Ashtech.

Figure 2:
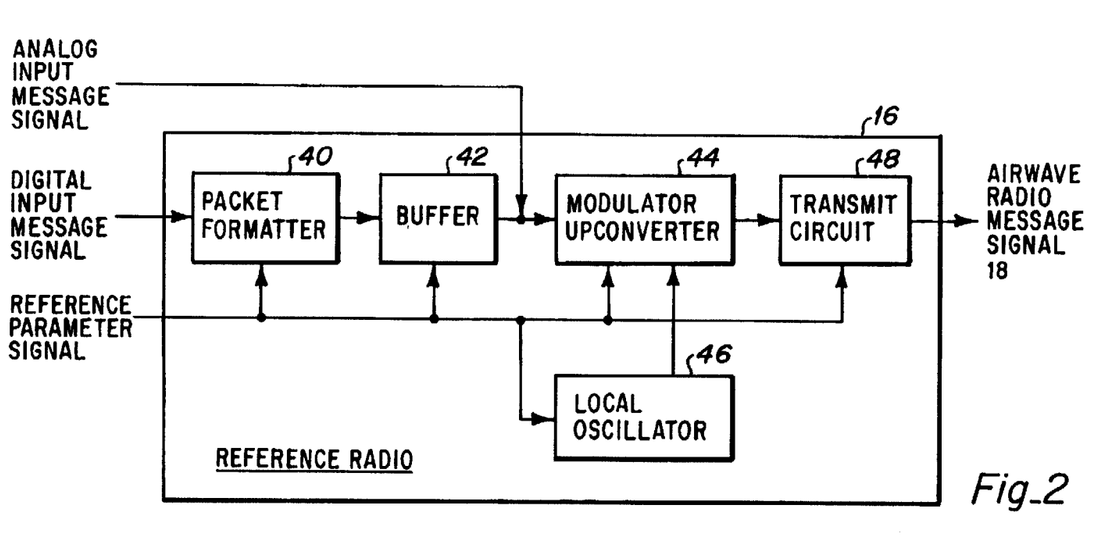
FIG. 2 is a block diagram of a reference radio in the radio system of FIG. 1.

FIG. 2 illustrates a block diagram of the reference radio 16 for transmitting the airwave radio message signal 18. Radio transmitter circuits for packet formatting, buffering, modulating, upconverting, providing a local oscillator (LO) signal for upconverting, and transmitting an airwave radio signal are well-known in the prior art. In the present invention of the reference radio 16, a packet formatter 40, a buffer 42, a modulator/upconverter 44, a local oscillator 46, and a transmit circuit 48 are configured for the local radio regulations by the parameter signal.

The packet formatter 40 formats a digital input message signal for the specified protocol and issues a formatted message signal to the buffer 42. The buffer 42 converts the formatted message signal to the specified baud rate and issues a buffered message signal. The packet formatter 40 and the buffer 42 are not required when the message has an analog form such as a voice input from a microphone. The modulator/upconverter 44 receives the buffered message signal or an analog input message signal and provides a transmit frequency modulated signal with the specified phase or frequency modulation type and the specified bandwidth. The radio regulations for the bandwidth typically specify an occupied bandwidth for the frequency band that contains a certain percentage of the total energy of the airwave message signal and may specify a necessary bandwidth for the minimum frequency band that is sufficient to ensure the communication of the message.

The local oscillator 46 provides an LO signal having a frequency specified in the parameter signal. Either of two upconversion circuit formats is preferred. In a direct format the modulator/upconverter 44 modulates the LO signal at the transmit frequency and issues the modulated signal to the transmit circuit. In an indirect format the modulator/upconverter 44 modulates an intermediate frequency signal and uses the LO signal to upconvert the modulated intermediate frequency to the transmit frequency. The modulation may be performed in the modulator/upconverter either by an IQ or a voltage controlled oscillator (VCO) type modulator. The transmit circuit 48, including an antenna amplifies the transmit frequency modulated signal for the specified transmit power and radiates the airwave radio message signal 18 from the antenna. The reference radio 16 also includes a microcontroller system for routing internal information and control, a power supply for supplying operating power, and a user interface.

Figure 3:
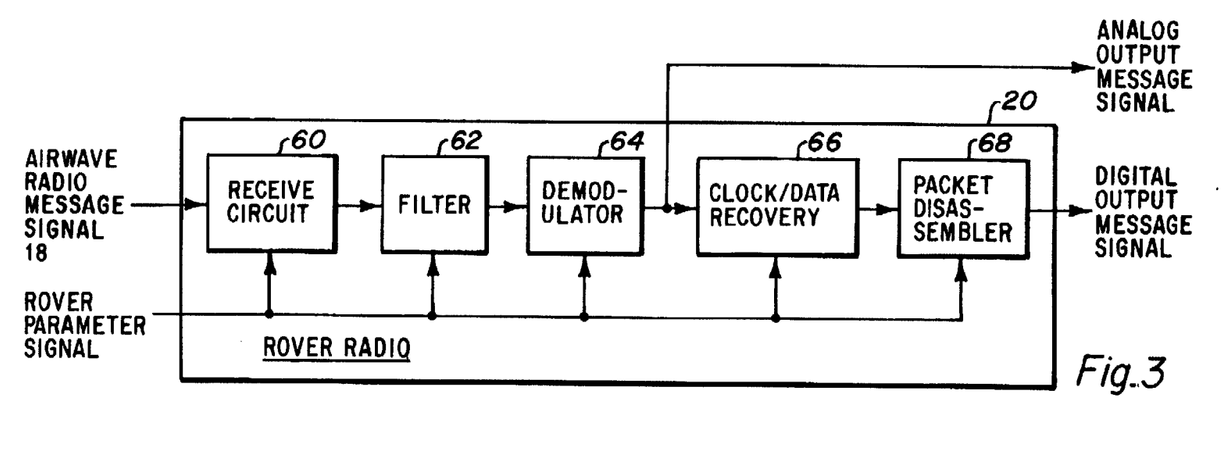
FIG. 3 is a block diagram of a rover radio in the radio system of FIG. 1.

FIG. 3 illustrates a block diagram of the rover radio 20 for receiving the airwave radio message signal 18. Radio receiver circuits for antennas, downconverters, filters, demodulators, clock and data recovery, packet disassembly are well-known in the prior art. In the present invention of the rover radio 20, a receive circuit 60 including an antenna and a downconverter, a filter 62, a demodulator 64, a clock/data recovery 66, and a packet disassembler 68 are configured for the local radio regulations by the parameter signal.

The receive circuit 60 includes the antenna to receive the airwave radio message signal 18 at the specified frequency and issue a representative conducted radio message signal and the downconverter including a local oscillator to downconvert the transmit frequency to an intermediate frequency (IF) or baseband signal. The filter 62 filters the IF or baseband signal to the specified bandwidth and/or baud rate. The demodulator 64 demodulates the filtered signal according to the specified phase or frequency modulation type and the bandwidth specified in the parameter signal. When the message is analog, such as voice, the demodulator 64 issues an analog message output signal. When the message is digital, the demodulator 64 issues the demodulated signal to the clock/data recovery 66. The demodulator 64 may use IQ or frequency discriminator type demodulation. The clock/data recovery 66 uses the parameter value for the baud rate to recover a formatted message signal and a clock signal.

The packet disassembler 68 uses the clock signal and parameter values for the protocol to disassemble the formatted message signal and issue a digital message output signal. The clock/data recovery 66 and the packet disassembler 68 are not required when the message has an analog form. The rover radio 20 also includes a microcontroller system for routing internal information and control, a power supply for supplying operating power, and a user interface.

In a preferred embodiment, the rover radio 20 is sequentially configured by the parameter signal to scan for airwave signal energy to find the particular alternative within the radio regulations being used by the airwave radio message signal 18. The packet disassembler 68 issues a flag signal to the map converter 28 when the airwave radio message signal 18 is received.

A user may use the user interface to override the parameter values for the radio regulations of the country or region where the rover station 14 is located, thereby allowing the rover radio 20 to receive the airwave radio message signal 18 when the rover station 14 is not located in the same region or country as the reference station 12. As a further option, if the user knows the region or country where the reference station is located, he/she may use the user entry to select to receive the airwave message signal according the radio regulations of that region or country.

Figure 4:
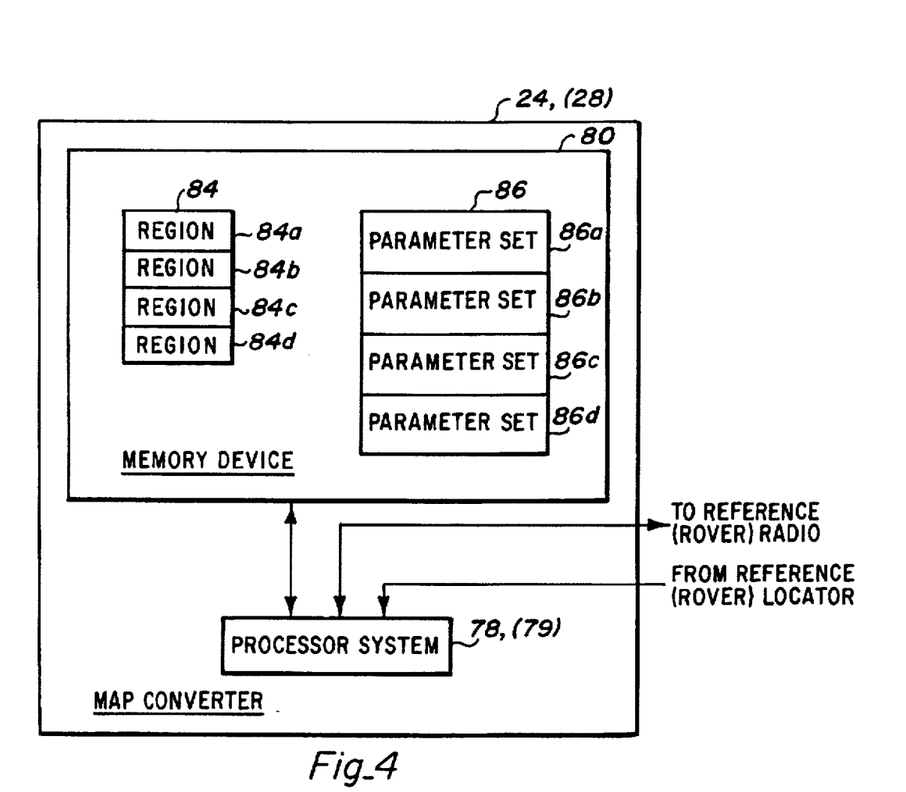
FIG. 4 is a block diagram of a map converter in the radios of FIGS. 2 and 3 for converting the geographical location to parameters for the radio regulations.

FIG. 4 illustrates a block diagram for the map converter 24 (and the map converter 28 noted within parentheses). The map converter 24 (28) includes a processing system 78 (79) in communication with a memory device 80. The processing system 78 (79) includes a microprocessor, processor memory, variable data stored in the processor memory, executable code stored in the processor memory, and input/output hardware. The microprocessor operates in a conventional manner to receive input signals directly or through the input/output hardware, to process the information in the input signals according to the variable data and the executable code, and to issue output signals either directly or through the input/output hardware. Input/output signals couple the processing system 78 (79) to and from the reference radio 16 (rover radio 20), the reference locator 22 (rover locator 26), and the scanning radio receiver 29. The processor memory may be combined with the memory device 80 into a single device or may be separate.

The memory device 80 includes a region database 84 and a parameter database 86. The region database 84 includes data for several regions represented by 84a, 84b, 84c, and 84d. The data for each region 84a to 84d includes the geographical boundaries of the particular region 84a to 84d and an index. The boundaries outline the geographical regions where particular radio regulations are required. Typically, the boundaries coincide with the boundaries of a nation or a group of nations as shown on a political map. The parameter database 86 includes data for several parameter sets represented by 86a, 86b, 86c, or 86d. The data for each parameter set 86a to 86d includes the index and the values for the parameters required for a particular radio regulation. The parameters include one or more of the transmit frequency, the transmit power level, the modulation type, the bandwidth, the baud rate, and the protocol. The index associates a particular region 84a to 84d to one or more corresponding parameter sets 86a to 86d.

The processor system 78 (79) determines which of the regions 84a to 84d enclose the geographical location determined by the reference locator 22 (rover locator 26) and uses the index to select the corresponding parameter set 86a to 86d. The processor system 78 (79) then issues information for the parameters and parameter values in the corresponding parameter set 86a to 86d in the parameter signal to the reference radio 16 (rover radio 20). Where the radio regulations allow alternatives, one region 84a to 84d may point to more than one of the parameter sets 86a to 86d. In the reference station 12, when more than one parameter set 86a to 86d corresponds to the region 84a to 84d, the processor system 78 issues each parameter set 86a to 86d sequentially in the parameter scan signal to the scanning radio receiver 29 and receives the level signal for the corresponding airwave signal energy level from the scanning radio receiver 29. The map converter 24 then issues the parameter signal corresponding to the lowest level to the reference radio 16. When the optional scanning radio receiver 29 is not included, the processor system 78 selects the parameter set 86a to 86d according to a hierarchy stored in the parameter set memory 86 or based upon information received through a user interface from a user. In the rover station 14, when more than one parameter set 86a to 86d corresponds to the enclosing region 84a to 84d, the processor system 79 issues each parameter set 86a to 86d sequentially in the parameter signal according to a predetermined hierarchy until the flag signal received from the rover radio 20 indicates that the airwave radio message signal is being received.

Figure 5:
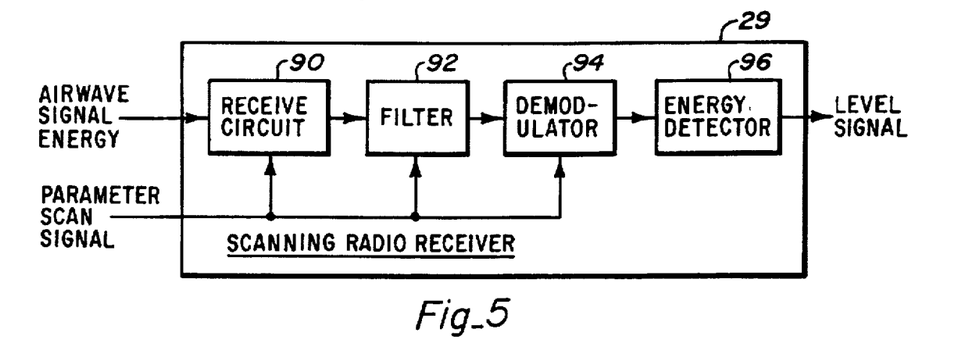
FIG. 5 is a block diagram of a scanning radio receiver in the reference radio of FIG. 2 for selecting an alternative within the radio regulations.

FIG. 5 illustrates a block diagram of the optional scanning radio receiver 29 including a receive circuit 90, a filter 92, a demodulator 94, and an energy detector 96. The scanning radio receiver 29 receives the parameter scan signal including the parameter values for the alternative parameter sets 86a to 86d from the map converter 24 and issues a level signal corresponding to the level of airwave signal energy of each alternative to the map converter 24. The receive circuit 90 includes an antenna to receive the airwave signal energy and issue conducted signal energy, a local oscillator to provide an LO signal at a frequency specified in the parameter signal, and a downconverter to use the LO signal to downconvert the conducted signal energy to an intermediate (IF) or baseband frequency signal. The filter 92 filters the IF or baseband signal according to the parameter scan signal for bandwidth and/or baud rate. The demodulator 94 demodulates the filtered signal according to the phase or frequency modulation type and bandwidth specified in the parameter scan signal and issues a demodulated signal. The energy detector 96 detects the energy level in the demodulated signal and issues the level signal to the map converter 24.

Figure 6A:
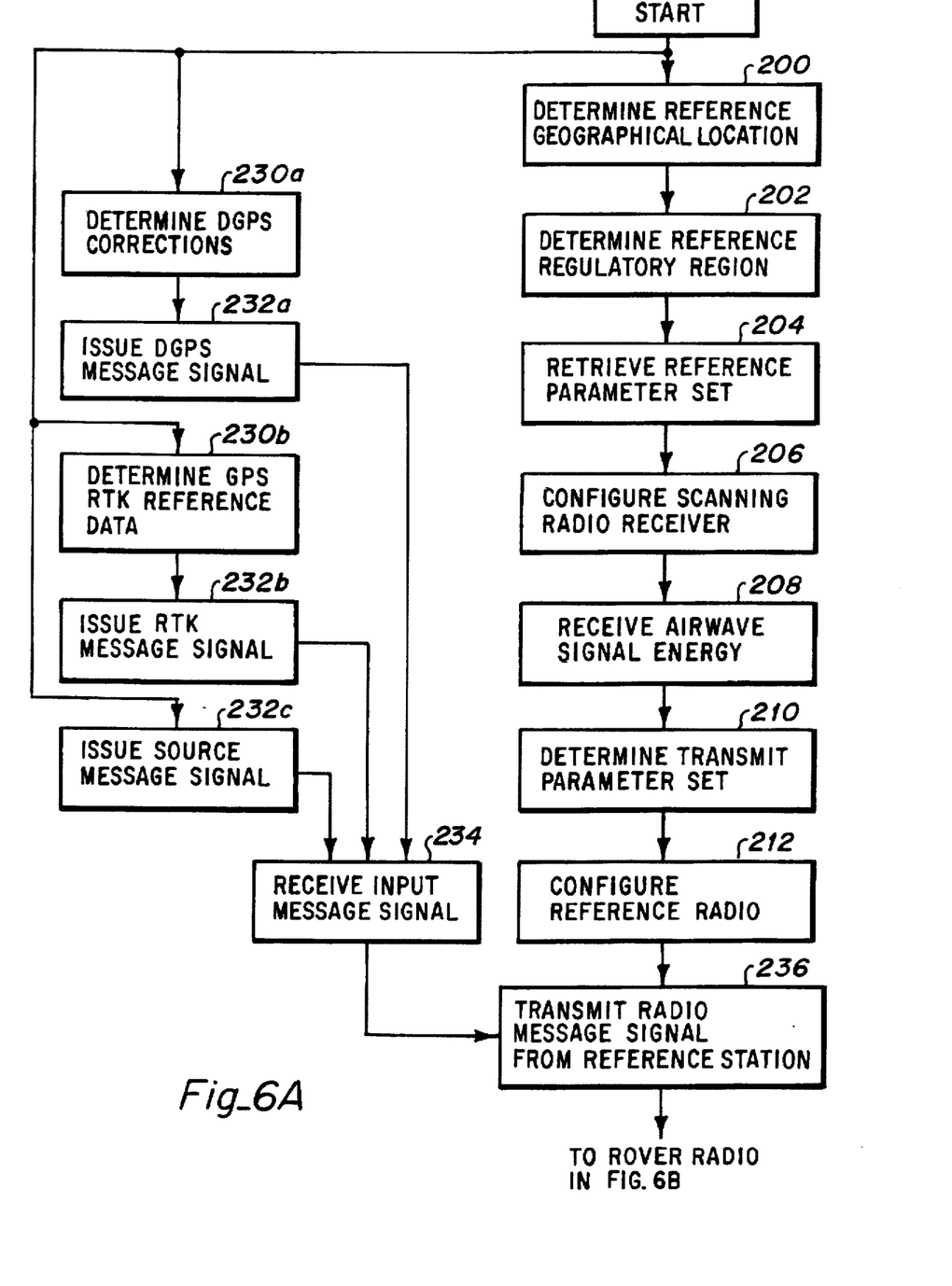
FIG. 6a is a flow chart of a method in the reference radio of FIG. 2 for transmitting a radio signal according to the radio regulations.

FIG. 6a illustrates the steps in a method for configuring the reference radio 16 to transmit the airwave radio message signal 18 according to the radio regulations of the location of the reference station 12. In a step 200 the reference locator 22 determines the geographical location of the reference station 12 and issues a signal indicative of the reference location to the map converter 24. In a preferred embodiment, the geographical location is determined by a GPS receiver receiving a GPS signal including location determination information from one or more GPS satellites. At a step 202 the map converter 24 determines the region 84a to 84d that encloses the reference geographical location. Then, in a step 204 the map converter 24 uses the index of the region 84a to 84d determined in the previous step to retrieve the corresponding parameter set 86a to 86d. The corresponding parameter set 86a to 86d has selection information for the protocol, the baud rate, the modulation type, bandwidth, the transmit frequency, and the transmit power according to the radio regulations for the region 84a to 84d.

In a step 206, when the reference station 12 is equipped with the optional scanning radio receiver 29 and when the region 84a to 84d indexes several parameter sets 86a to 86d, the map converter 24 issues selection information for the applicable parameter sets 86a to 86d in sequence in the parameter scan signal. The scanning radio receiver 29 receives the parameter scan signal and configures the receive circuit 90 for the specified frequency, the filter 92 for the specified bandwidth and baud rate, and the demodulator 94 for the specified bandwidth and modulation. At a step 208 the scanning radio receiver 29 receives airwave signal energy for each configuration, measures a corresponding energy level, and issues the level signal. In a step 210 the map converter 24 determines the lowest level and issues the corresponding parameter signal to the reference radio 16. Then, in a step 212 the reference radio 16 receives the parameter signal and configures the packet formatter 40 for the specified protocol, the buffer 42 for the specified baud rate, the modulator/upconverter 44 for the specified modulation type and bandwidth, the local oscillator 46 for the specified frequency, and the transmit circuit 48 for the specified power level.

In a step 232c a message source provides the input message signal. In an optional step 230a the message source is the differential reference GPS receiver 30 receives the GPS signal from several GPS satellites and determines the DGPS corrections. In a step 232a the differential reference GPS receiver 30 issues the DGPS corrections in the input message signal. Alternatively, in an optional step 230b the RTK reference GPS receiver 34 receives the GPS signal from several GPS satellites and determines the RTK reference information. In a step 232b the RTK reference GPS receiver 34 issues the RTK reference information in the message signal. At a step 234, the reference radio 16 receives the input message signal. Then, in a step 236 the reference radio 16 transmits the airwave radio message signal 18 including the message according to the radio regulations where the reference station 12 is located.

Figure 6B:
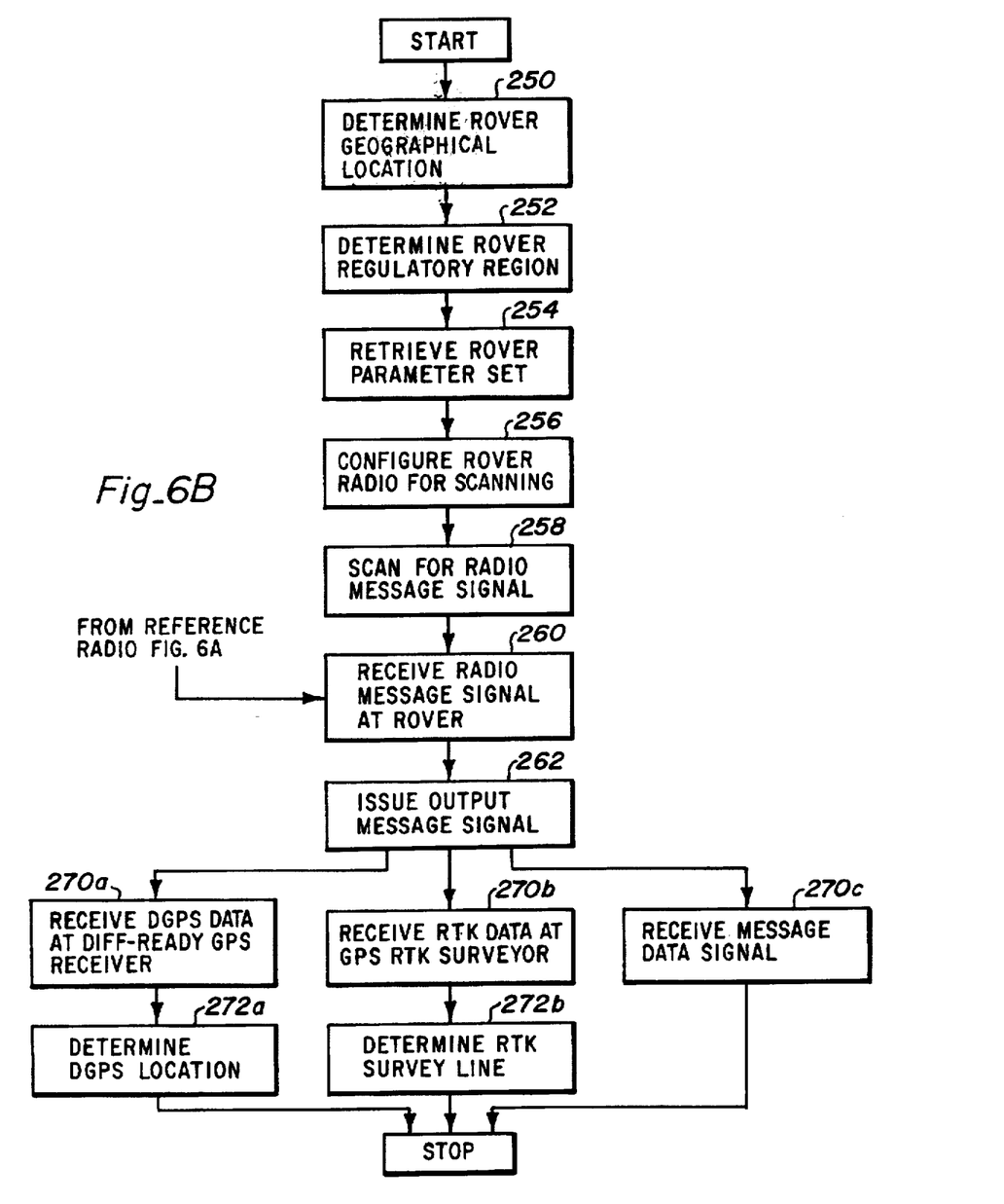
FIG. 6b is a flow chart of a method in the rover radio of FIG. 3 for receiving the radio signal according to the radio regulations.

FIG. 6b illustrates the steps in a method for configuring the rover radio 20 to receive the airwave radio message signal 18 according to the radio regulations where the rover station 14 is located. In a step 250 the rover locator 26 determines the geographical location of the rover station 12 and issues a signal indicative of the location to the map converter 28. In a preferred embodiment, a GPS receiver determines the geographical location from location determination information in the GPS signal from one or more GPS satellites. At a step 252 the map converter 28 determines the region 84a to 84d that encloses the location. Optionally, the user may use the user interface in the rover radio 20 to override the geographical location. Such override are be necessary when the reference station 12 and the rover station 14 are located in different countries or regions. Then, in a step 254 the map converter 28 uses the index of the region 84a to 84d determined in the previous step to retrieve the corresponding parameter set 86a to 86d. The corresponding parameter set 86a to 86d has selection information for the protocol, the baud rate, the modulation type, the bandwidth, the transmit frequency, and the transmit power according to the radio regulations for the region 84a to 84d.

In a step 256, when several parameter sets 86a to 86d correspond to the determined region 84a to 84d, the map converter 28 issues the selection information for the applicable parameter sets 86a to 86d in sequence in the parameter signal. The rover radio 20 receives the parameter signal and configures the filter 62 for the bandwidth, the demodulator 64 for the specified modulation type and bandwidth, the clock/data recovery 66 for the specified baud rate, and the packet disassembler 68 for the specified protocol and baud rate. At a step 258 the rover radio 20 scans for the airwave radio message signal 18. In a step 260 the rover radio receives the airwave radio message signal 18 and issues the flag signal to the map converter 28.

In a step 262 the rover radio 20 issues the message in the output message signal. In a step 270c a message terminal receives the output message signal. In an optional step 270a the message terminal is the differential-ready GPS receiver 32 for receiving the DGPS corrections in the message signal. In a step 272a the differential-ready GPS receiver 32 receives the GPS signal from several GPS satellites and processes the location determination information in the GPS signal and the DGPS corrections to compute a differentially-corrected rover geographical location. Alternatively, in a step 270b the message terminal is the RTK surveyor GPS receiver 36 for receiving the RTK reference information in the message signal. In a step 272b the RTK surveyor 36 receives the GPS signal from several GPS satellites and computes the survey line between the location of the RTK reference GPS receiver 34 and the RTK surveyor GPS receiver 36.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A radio system for automatically configuring to a radio regulation for a geographical region where the system is located, the system comprising:

a reference locator for determining a reference geographical location;

a reference map converter, coupled to the reference locator, for selecting a radio regulation for a geographical region enclosing said geographical location;

a reference radio, coupled to the reference map converter, for receiving an input signal having a message and for configuring according to said selected radio regulation for transmitting said message in an airwave radio message signal having a form that conforms to said selected radio regulation;

a rover locator, located in said geographical region, for determining a rover geographical location;

a rover map converter, coupled to the rover locator, for selecting said radio regulation based upon said rover geographical location; and a rover radio, coupled to said rover map converter, for configuring according to said selected radio regulation to receive said airwave radio message signal.

2. The system of claim 1, wherein:

the reference locator includes a Global Positioning System (GPS) receiver for receiving a GPS signal including location determination information from one or more GPS satellites and for determining said reference geographical location from said location determination information.

3. The system of claim 1, wherein:

said radio regulation includes at least one of (i) a transmit frequency for said radio message signal, (ii) a transmit power for said radio message signal, (iii) a bandwidth for said radio message signal, (iv) a modulation type for said radio message signal, (v) a baud rate for said radio message signal, and (vi) a protocol for said radio message signal.

4. The system of claim 1, further including:

a differential reference GPS receiver located at a known location for receiving a GPS signal including location determination information from several GPS satellites, for determining a differential GPS (DGPS) correction based upon a comparison of information representing said known location and said location determination information, and for issuing said DGPS correction in said message in said input signal.

5. The system of claim 1, further including:

a real time kinematic reference GPS receiver for receiving a GPS signal including location determination information from several GPS satellites, for determining real time kinematic GPS reference information based upon said location determination information, and for issuing said real time kinematic reference information in said message in said input signal.

6. The system of claim 1, wherein:

said rover locator includes a Global Positioning System (GPS) receiver for receiving a GPS signal having location determination information from one or more GPS satellites and for determining said rover geographical location from said location determination information.

7. The system of claim 1, wherein:

said radio regulation includes a plurality of alternative radio regulations;

the rover map converter is further for selecting at least two said alternative radio regulations; and the rover radio is further for configuring to receive an airwave signal energy according to said selected alternative radio regulations.

8. A radio apparatus for automatically configuring to a radio regulation for a geographical region where the system is located, the system comprising:

a locator for determining a geographical location;

a map converter for converting said geographical location into at least two alternative radio regulations, each of said alternative regulations corresponding to said location; and a radio including a scanning radio receiver for configuring according to said alterative radio regulations to receive an airwave signal energy conforming to said alternative radio regulations, for detecting an energy level corresponding to each of said alternative radio regulations, and for configuring the radio to a one of said alternative radio regulations corresponding to a lowest energy level for transmitting an airwave radio message signal.

9. A method in a radio system for automatically configuring to a radio regulation for a geographical region where the system is located, including the steps of:

determining a geographical region enclosing a reference geographical location of a reference radio;

converting said geographical region to a radio regulation;

configuring said reference radio according to said radio regulation for transmitting an airwave radio message signal, including a message, in a form the conforms to said radio regulation;

determining a rover geographical location of a rover radio;

determining said geographical region enclosing said rover geographical location;

converting said rover geographical region to said radio regulation; and configuring said rover radio according to said radio regulation to receive said airwave radio message signal in a form that conforms to said radio regulation.

10. The method of claim 9, wherein determining said reference geographical location further includes steps of:

receiving a GPS signal having location determination information from one or more GPS satellites with a GPS receiver; and determining said reference geographical location from said location determination information.

11. The method of claim 9, wherein:

said radio regulation includes at least one of (i) a transmit frequency for said radio message signal, (ii) a transmit power for said radio message signal, (iii) a bandwidth for said radio message signal, (iv) a modulation type for said radio message signal, (v) a baud rate for said radio message signal, and (vi) a protocol for said radio message signal.

12. The method of claim 9, further including steps of:

providing a differential reference GPS receiver connected to said reference station;

locating said differential reference GPS receiver at a known location;

receiving a GPS signal having location determination information from several GPS satellites with said differential reference GPS receiver;

determining a differential GPS correction from information for said known location and said location determination information; and issuing said differential GPS correction in said message.

13. The method of claim 9, further including steps of:

providing a real time kinematic reference GPS receiver connected to said reference station;

locating said real time kinematic reference GPS receiver at a first end of a survey line;

receiving a GPS signal from several GPS satellites with said real time kinematic reference GPS receiver;

determining real time kinematic GPS reference information from said GPS signal; and issuing said real time kinematic GPS reference information in said message.

14. The method of claim 9, wherein determining said rover geographical location further includes steps of:

receiving a GPS signal having location determination information from one or more GPS satellites with a GPS receiver in said rover station; and determining said rover geographical location from said location determination information.

15. The method of claim 9, further including steps of:

configuring said rover radio according to at least two alternatives of said radio regulations;

receiving said airwave signal energy according to said alternatives; and selecting one of said alternatives for receiving said airwave radio message signal.

16. A method in a radio system for automatically configuring to a radio regulation for a geographical region where the system is located, including the steps of:

determining a geographical region enclosing a radio including a scanning receiver;

converting said geographical region to a plurality of alternative radio regulations;

configuring a scanning radio receiver according to at least two of said alternative radio regulations;

receiving airwave signal energy according to said alternatives;

detecting an energy level corresponding to each of said alternatives;

selecting, based upon said energy level, one of said alternatives; and configuring said radio according to said selected alternative to transmit said airwave radio message signal.

* * * * *